(12) United States Patent
Adir

(10) Patent No.: US 12,082,726 B2
(45) Date of Patent: Sep. 10, 2024

(54) METHODS OF CLEANING A DRINKING HOSE (STRAW)

(71) Applicant: Ilan Daniel Adir, Palm Beach, FL (US)

(72) Inventor: Ilan Daniel Adir, Palm Beach, FL (US)

( * ) Notice: Subject to any disclaimer, the term of this patent is extended or adjusted under 35 U.S.C. 154(b) by 127 days.

(21) Appl. No.: 17/968,302

(22) Filed: Oct. 18, 2022

(65) Prior Publication Data
US 2023/0044899 A1 Feb. 9, 2023

Related U.S. Application Data

(60) Division of application No. 17/322,016, filed on May 17, 2021, which is a continuation-in-part of application No. 16/997,078, filed on Aug. 19, 2020, now abandoned.

(60) Provisional application No. 62/948,518, filed on Dec. 16, 2019.

(51) Int. Cl.
| | | |
|---|---|---|
| A47G 21/18 | (2006.01) | |
| B08B 9/027 | (2006.01) | |
| B08B 11/00 | (2006.01) | |
| E03B 1/04 | (2006.01) | |
| E03B 11/02 | (2006.01) | |
| F16L 11/04 | (2006.01) | |

(52) U.S. Cl.
CPC .............. *A47G 21/18* (2013.01); *B08B 9/027* (2013.01); *E03B 1/04* (2013.01); *E03B 11/02* (2013.01); *F16L 11/04* (2013.01); *A47G 21/186* (2013.01); *B08B 11/00* (2013.01)

(58) Field of Classification Search
CPC ........ A47G 21/18–189; A47G 19/2266; B65D 77/28–286; A61J 15/00–0096; A61J 7/0038; A61J 9/006; F16L 11/00–26; B08B 9/00–46; B08B 11/00–04; B08B 1/00–54
See application file for complete search history.

(56) References Cited

U.S. PATENT DOCUMENTS

| | | |
|---|---|---|
| 103,299 A | 5/1870 | Chapin |
| 5,484,405 A | 1/1996 | Edstrom, Sr. |
| 5,885,508 A | 3/1999 | Ishida |
| 5,996,269 A | 12/1999 | Takata et al. |
| 6,660,363 B1 | 12/2003 | Barthlott |
| 7,207,968 B1 | 4/2007 | Harcinske |
| 9,155,683 B2 | 10/2015 | Murrieta |
| D747,462 S | 1/2016 | Elish et al. |
| 9,289,575 B2 | 3/2016 | Dye |
| 9,474,878 B2 | 10/2016 | Dye |
| 9,775,781 B2 | 10/2017 | Wheeler et al. |

(Continued)

OTHER PUBLICATIONS

Tharmaratnam et al., "Chapter 38—Guiding Catheters", Springer Intl. Publishing; pp. 583 & 586. (Year: 2018).
French Catheter Scale; Wikipedia; 2 PP. (Year: 2023).

*Primary Examiner* — Mikhail Kornakov
*Assistant Examiner* — Richard Z. Zhang
(74) *Attorney, Agent, or Firm* — Young Basile Hanlon & MacFarlane, P.C.

(57) ABSTRACT

A personal hydration system is disclosed that includes a reservoir and a drinking hose (drinking straw). The drinking hose is in fluid communication with the reservoir and includes a textured (irregular) inner surface configuration to facilitate cleaning of the drinking hose. In certain embodiments of the disclosure, the drinking hose is configured and provided as a standalone component (product).

10 Claims, 4 Drawing Sheets

(56) References Cited

U.S. PATENT DOCUMENTS

| | | |
|---|---|---|
| 9,878,125 B2 | 1/2018 | Dye |
| 2005/0010169 A1 | 1/2005 | Kuhlein et al. |
| 2007/0048344 A1 | 3/2007 | Yahiaoui et al. |
| 2007/0048358 A1 | 3/2007 | Schorr et al. |
| 2013/0037031 A1 | 2/2013 | Gredat |
| 2014/0252115 A1* | 9/2014 | Toepfert ............... A47G 21/188 264/150 |
| 2014/0378951 A1 | 12/2014 | Dye |
| 2015/0373989 A1 | 12/2015 | Krasnow et al. |
| 2016/0199616 A1 | 7/2016 | Dye |
| 2017/0021130 A1 | 1/2017 | Dye |
| 2021/0180299 A1 | 6/2021 | Adir |
| 2021/0285191 A1 | 9/2021 | Adir |
| 2023/0044899 A1 | 2/2023 | Adir |

* cited by examiner

METHODS OF CLEANING A DRINKING HOSE (STRAW)

CROSS-REFERENCE TO RELATED APPLICATION(S)

This application is a divisional of U.S. patent application Ser. No. 17/322,016, filed on May 17, 2021, which is a continuation-in-part of U.S. patent application Ser. No. 16/997,078, filed on Aug. 19, 2020, which claims the benefit of and priority to U.S. Provisional Patent Application Ser. No. 62/948,518, filed on Dec. 16, 2019, the entire contents of which are hereby incorporated by reference.

TECHNICAL FIELD

The present disclosure relates generally to personal hydration systems and, more specifically, to a personal hydration system that includes a drinking hose (drinking straw) with a textured (irregular) inner surface configuration that facilitates exfoliation and cleaning of the drinking hose to improve cleanliness.

BACKGROUND

The importance of personal hydration is well known. To keep hydrated, many individuals use plastic bottles, cups, glasses, and the like in various locations in their homes, offices, etc. These articles can accumulate in number, however, and are often unsanitary in that they can foster bacterial growth and/or collect pet hair, dander, dust, etc.

To address these issues, the present disclosure provides a personal hydration system that can be mounted, supported, and/or carried and utilized in an individual's home (e.g., at a bedside), in an office (e.g., on a desk), in a hospital, a hospice, or an assisted living environment, in a vehicle (e.g., an automobile, an airplane, a boat, etc.), or any other such suitable setting.

SUMMARY

In one aspect of the present disclosure, a personal hydration system is disclosed that includes a reservoir and a drinking hose. The drinking hose is in fluid communication with the reservoir and includes a textured inner surface configuration to facilitate cleaning of the drinking hose.

In certain embodiments, to reduce fluctuation in the temperature of the fluid retained within the reservoir, it is envisioned that the reservoir may be insulated. For example, it is envisioned that the reservoir may include a double-walled construction.

In certain embodiments, the drinking hose may include an antimicrobial agent.

In certain embodiments, the drinking hose may define a longitudinal channel to allow for fluid communication through the drinking hose.

In certain embodiments, the drinking hose may include projections that extend radially inward into the longitudinal channel.

In certain embodiments, each projection may define an arcuate configuration.

In certain embodiments, the projections may be arranged into rows that extend in generally parallel relation to each other.

In certain embodiments, the rows may extend in generally parallel relation to a longitudinal axis of the drinking hose.

In certain embodiments, the rows may be spaced circumferentially from each other such that the projections in adjacent rows are offset from each other along a longitudinal axis of the drinking hose.

In certain embodiments, each projection may define a peak.

In certain embodiments, the drinking hose may be configured such that adjacent projections are spaced from each other so as to define a space there between.

In certain embodiments, the drinking hose may be configured such that the peaks of the projections in a first row are generally aligned with the spaces defined between the adjacent projections in a second row.

In certain embodiments, the projections may be substantially identical in configuration.

In certain embodiments, each projection may define a width and the drinking hose may be configured such that the adjacent projections are spaced from each other by a distance that is approximately equal to one-half of the width of each projection.

In one aspect of the present disclosure, a personal hydration system is disclosed that includes a reservoir and a drinking hose that is in fluid communication with the reservoir. The drinking hose includes internal projections that are arranged in a staggered pattern to facilitate abrasion of the drinking hose via an external force applied during cleaning.

In certain embodiments, adjacent projections may be spaced from each other so as to define a space there between that is configured to receive a corresponding projection upon application of the external force.

In certain embodiments, the projections may be substantially identical in configuration.

In certain embodiments, each projection may define a width and the drinking hose may be configured such that the projections are spaced from each other by a distance approximately equal to one-half of the width of each projection.

In certain embodiments, the projections may be arranged into rows that extend in generally parallel relation to each other.

In certain embodiments, the rows may extend in generally parallel relation to a longitudinal axis of the drinking hose.

In certain embodiments, the personal hydration system may further include a mount that is connectable to a surface.

In certain embodiments, the reservoir may be configured for releasable engagement with the mount such that the personal hydration system is supportable in a manner facilitating gravity-assisted dispensation of fluid from the reservoir through the drinking hose.

In another aspect of the present disclosure, a method of cleaning a personal hydration system including a drinking hose is disclosed. The method includes applying an external force to the drinking hose such that internal projections arranged along an inner surface of the drinking hose are brought into engagement with each other to facilitate abrasion and removal of contaminants from the drinking hose.

In certain embodiments, applying the external force to the drinking hose may include positioning a first series of projections between a second series of projections.

In certain embodiments, positioning the first series of projections between the second series of projections may include positioning projections arranged a first row between adjacent projections arranged in a second row.

In another aspect of the present disclosure, a drinking straw is disclosed that includes an inner surface with a textured configuration to facilitate cleaning of the drinking straw.

In certain embodiments, the drinking straw may include an antimicrobial agent.

In certain embodiments, the antimicrobial agent may be configured as a coating that is applied to at least one of an inner surface of the drinking straw and an outer surface of the drinking straw.

In certain embodiments, the drinking straw may include projections that extend inwardly from an inner wall thereof.

In certain embodiments, each projection may define an arcuate configuration.

In certain embodiments, the projections may be arranged into rows that extend in generally parallel relation to each other.

In certain embodiments, the rows may extend in generally parallel relation to a longitudinal axis of the drinking straw.

In certain embodiments, the rows may be spaced circumferentially from each other such that the projections in adjacent rows are offset from each other along a longitudinal axis of the drinking straw.

In certain embodiments, each projection may define a peak.

In certain embodiments, the drinking straw may be configured such that adjacent projections are separated from each other so as to define a space there between.

In certain embodiments, the drinking straw may be configured such that the peaks of the projections in a first row are generally aligned with the spaces defined between adjacent projections in a second row.

In certain embodiments, each projection may define a width and the drinking straw may be configured such that adjacent projections are separated from each other by a distance that is approximately equal to one-half of the width of each projection.

In another aspect of the present disclosure, a drinking straw is disclosed that includes a longitudinal channel and projections that extend inwardly into the longitudinal channel from an inner wall of the drinking straw. The projections are arranged in a staggered pattern to facilitate abrasion of the drinking straw via an external force applied during cleaning.

In certain embodiments, adjacent projections may be spaced from each other so as to define a space there between that is configured to receive a corresponding projection upon application of the external force.

In certain embodiments, the projections may be substantially identical in configuration.

In certain embodiments, each projection may define a width and the drinking straw may be configured such that the projections are spaced from each other by a distance that is approximately equal to one-half of the width of each projection.

In certain embodiments, the projections may be arranged into rows that extend in generally parallel relation to each other.

In certain embodiments, the rows may extend in generally parallel relation to a longitudinal axis of the drinking straw.

In another aspect of the present disclosure, a method of cleaning a drinking straw is disclosed that includes applying an external force to the drinking straw such that internal projections arranged along an inner surface of the drinking straw are brought into engagement with each other to facilitate abrasion and removal of contaminants from the drinking straw.

In certain embodiments, applying the external force to the drinking straw may include positioning a first series of projections between a second series of projections.

In certain embodiments, positioning the first series of projections between the second series of projections may include positioning projections arranged a first row between adjacent projections arranged in a second row.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes a personal hydration system that includes a reservoir and a drinking hose that is in fluid communication with the reservoir such that a user can draw fluid from the reservoir through the drinking hose. The drinking hose includes a textured (irregular) inner surface configuration that facilitates cleaning of the drinking hose. More specifically, as described in further detail below, the drinking hose includes an inner surface with a series of projections that are arranged in a staggered (e.g., offset) pattern such that the projections are brought into engagement with each other upon the (manual) application of an external force to the drinking hose. By manipulating (e.g., massaging) the drinking hose, the projections are caused to abrade each other, as well as the spaces there between, to remove contaminants (e.g., pet hair, dander, dust, bacteria, etc.) and thereby clean (scour) the drinking hose.

To increase utility, it is envisioned that the personal hydration system may be configured for mounting to a surface (e.g., a wall, a door, the headboard of a bed, a chair, a desk, a vehicle dashboard, etc.) and/or that the personal hydration system may be configured for support by a pedestal (or other such stand, platform, etc.), a hitch (hanger), or the like. Additionally, or alternatively, it is envisioned that the personal hydration system may be configured for transport by a user. For example, the personal hydration system may include, may be connectable to, or may be configured as a wearable article.

Figure 1:
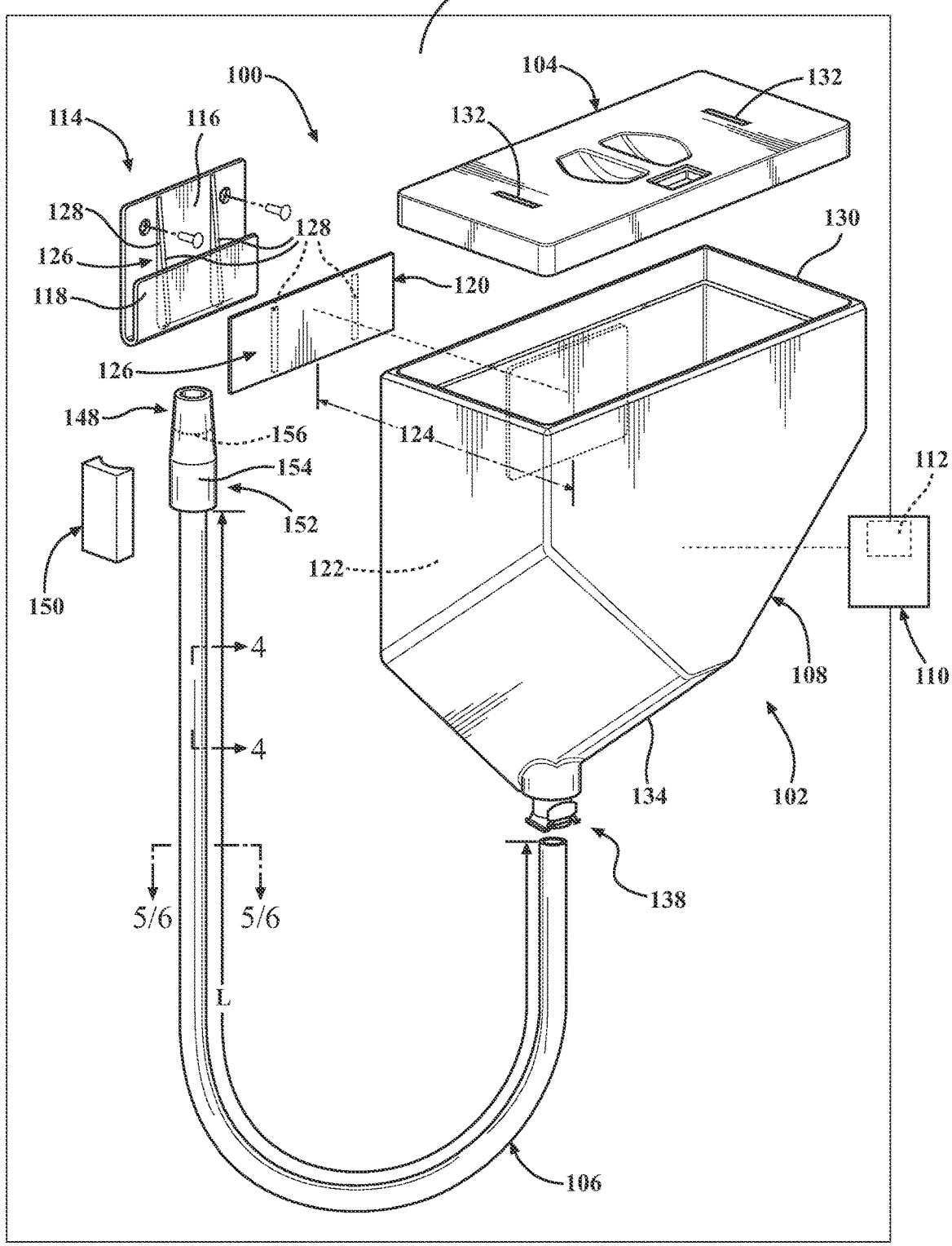
FIG. 1 is a top, perspective view of a personal hydration system includes a reservoir and a drinking hose (drinking straw) in accordance with the principles of the present disclosure.

FIG. 1 illustrates one embodiment of the personal hydration system, which is identified by the reference character 100. As discussed in detail below, the personal hydration system 100 includes a reservoir 102 with a lid 104 and a drinking hose (drinking straw) 106 that is in fluid communication with the reservoir 102 to allow a user to draw fluid therefrom. Although generally described herein below in the context of home use (e.g., at a user's bedside), it should be appreciated that the personal hydration system 100 may be utilized in any suitable environment. For example, it is envisioned that the personal hydration system 100 may find utility in an office setting, in a hospital, hospice, or assisted living environment, in a vehicle (e.g., an automobile, an airplane, a boat, or the like), etc. The personal hydration system 100 stores a drinkable fluid (e.g., water) in a closed system so as to inhibit (if not entirely eliminate) contamination via pet hair, dander, dust, bacteria, etc., and reduces (if not entirely eliminates) the need for cups, glasses, bottles, and the like, thereby reducing the accumulation of such articles. Additionally, as described herein below, the personal hydration system 100 may be mounted, supported, or worn, which inhibits (if not entirely eliminates) spillage that may otherwise occur with cups, glasses, bottles, and the like.

The reservoir 102 (including the lid 104) may include any suitable material or combination of materials (e.g., commercial or medical-grade plastic(s), polymer(s), rubber(s), metallic material(s), etc.) and may be formed through any suitable method of manufacture (e.g., injection molding, 3-D printing, machining, etc.). To enhance usability, cleanliness, and convenience, it is envisioned that the material(s) used in construction of the reservoir 102 may be dishwasher safe.

The reservoir 102 may be configured to retain any suitable volume of fluid. For example, in the illustrated embodiment, the reservoir 102 includes a body 108 that is configured to retain an amount of fluid that lies substantially within the range of approximately 32 fl. oz. to approximately 128 fl. oz. It should be appreciated, however, that volumes outside of the disclosed range are also contemplated herein and would not be beyond the scope of the present disclosure. To reduce fluctuation in the temperature of the fluid retained by the reservoir 102, in certain embodiments, it is envisioned that the body 108 of the reservoir 102 may include an insulated, double-walled construction.

To further improve the user experience, in certain embodiments, it is envisioned that the personal hydration system 100 may include a temperature control system 110 to allow for heating and/or cooling of the fluid retained within the reservoir 102. In such embodiments, it is envisioned that the temperature control system 100 may be powered in any suitable manner, such as, for example, via an integrated power source 112 (e.g., a battery) or via connection to an external power source (e.g., a wall outlet).

In certain embodiments, the reservoir 102 may be configured for engagement with (connection to) a mount 114 (e.g., a bracket 116), which may be provided as an additional component of the personal hydration system 100, to allow for mounting of the reservoir 102 to a surface S (e.g., a wall, a door, the headboard of a bed, a chair, a desk, a vehicle dashboard, etc.). For example, in the illustrated embodiment, the mount 114 is configured as a bracket 116 that defines a lip 118. As elaborated on below, mounting (or otherwise supporting) the personal hydration system 100 in the manner described herein facilitates the gravity-fed dispensation of fluid from the reservoir 102 to further enhance usability of the personal hydration system 100.

The reservoir 102 may be configured for connection to (support by) the mount 114 in any suitable manner. For example, in the illustrated embodiment, the reservoir 102 includes a mounting plate 120 that is secured (connected) to a rear surface 122 of the body 108 so as to define a receiving space 124 for the mount 114 (e.g., the lip 118) such that mount 114 removably supports the reservoir 102 on the surface S, which allows for refilling, cleaning, etc.

In certain embodiments, it is envisioned that the mount 114 and the mounting plate 120 may be configured such that the body 108 of the reservoir 102 is movable in relation to the mount 114. For example, the mount 114 and/or the mounting plate 120 may include a hinge (or other such member or mechanism) to allow the reservoir 102 to pivot in relation to the mount 114. For example, in the context of an office chair or a gaming chair, such a configuration may allow the personal hydration system 100 to accommodate movement (e.g., swiveling or tilt-angle adjustment) of the chair, thereby reducing (if not entirely preventing) spillage that may otherwise occur.

In certain embodiments, it is envisioned that the mount 114 and/or the reservoir 102 (e.g., the mounting plate 120) may include one or more location features 126 (e.g., ribs 128, slots, flanges, detents, recesses, etc.) that not only facilitate proper relative orientation of the reservoir 102 and the mount 114, but inhibit (if not entirely prevent) undesirable movement of the reservoir 102 relative to the mount 114 (e.g., lateral (horizontal) movement or sliding of the reservoir 102).

Figure 2:
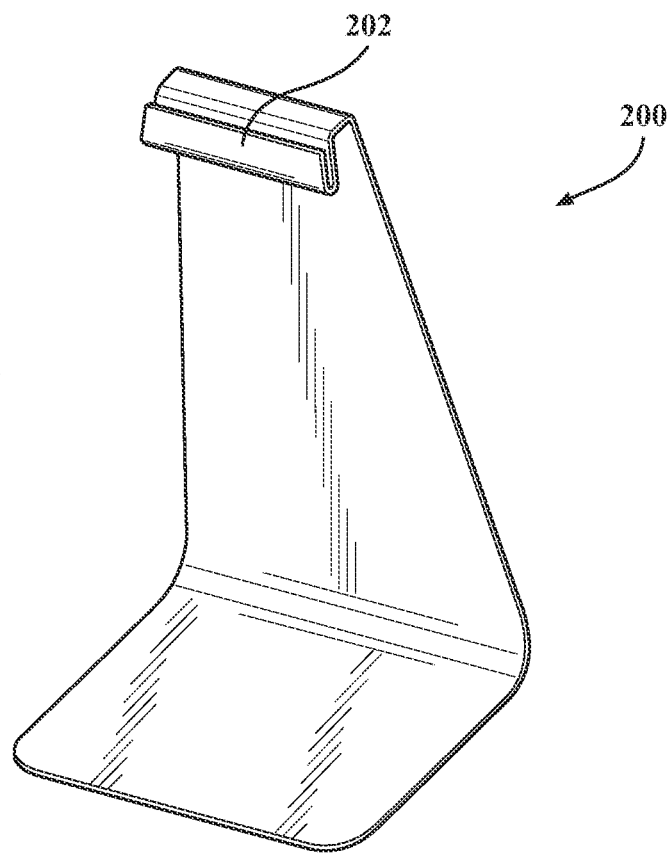
FIG. 2 is a side, perspective view of a pedestal (stand) for use with the personal hydration system seen in FIG. 1.
Figure 3:
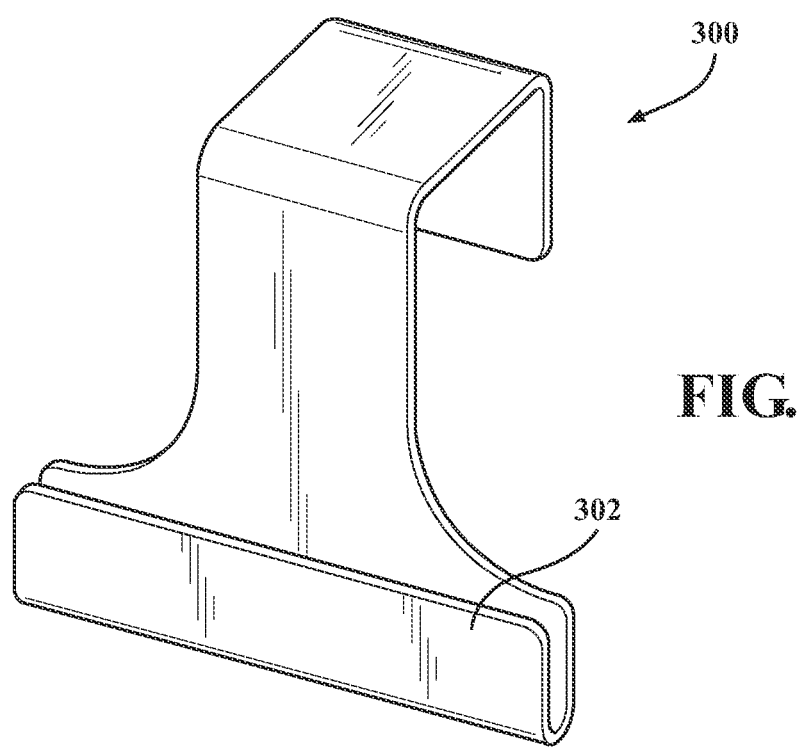
FIG. 3 is a side, perspective view of a hitch (hanger) for use with the personal hydration system seen in FIG. 1.

Additionally, or alternatively, it is envisioned that the personal hydration system 100 may be configured for support by a pedestal (stand) 200 (FIG. 2) or a hitch (hanger) 300 (FIG. 3). To facilitate support of the personal hydration system 100, the pedestal 200 and the hitch 300 define lips 202, 302, respectively, that are configured for insertion into (reception by) the receiving space 124 (FIG. 1) in a manner similar to that discussed above with respect to the mount 114. In certain alternate embodiments, is also envisioned the personal hydration system 100 may be incorporated into the construction of an article, such as, for example, a gaming chair, a desk chair, the headboard of a bed, a hospital bed, etc., which also allows for the gravity-fed dispensation of fluid from the reservoir 102.

With reference again to FIG. 1, the lid 104 is configured for engagement with (connection to) an upper (top) end 130 of the body 108 of the reservoir 102 to inhibit (if not entirely prevent) contamination of the fluid retained therein. It is envisioned that the lid 104 may be either fixedly or removably engageable with (connectable to) the body 108 and that the lid 104 may include a movable or removable access panel (e.g., to facilitate filling, drainage, cleaning, etc. of the reservoir 102). So as not to interfere with (or unduly hamper) fluid dispensation from the reservoir 102, it is envisioned that the lid 104 may include one or more vents 132.

With reference now to FIGS. 4-7 as well, the drinking hose 106 will be discussed. The drinking hose 106 extends from a lower (bottom) end 134 of the body 108, which facilitates the gravity-fed dispensation of fluid from the reservoir 102. In alternate embodiments of the personal hydration system 100, it is envisioned that the drinking hose 106 may be either fixedly connected to the reservoir 102 or removably connected to the reservoir 102 (e.g., to facilitate cleaning of the drinking hose 106). To improve the quality of the fluid dispensed through the drinking hose 106, it is envisioned that the reservoir 102 and/or the drinking hose 106 may include one or more filtering elements (not shown), such as a charcoal filter, a gill-style filter, a UV (ultraviolet) filter, a HEPA filter, etc., which may be positioned in any suitable location or incorporated in any suitable manner. For example, it is envisioned that one or more filtering elements may be included (provided) at the interface (connector) between the reservoir 102 and the drinking hose 106.

The drinking hose 106 may include any suitable material or combination of materials (e.g., commercial or medical-grade plastic(s), polymer(s), rubber(s), metallic material(s), etc.) and may be formed through any suitable method of manufacture (e.g., injection molding, 3-D printing, machining, etc.). In the particular embodiment of the disclosure seen in the figures, for example, the drinking hose 106 includes (e.g., is formed partially or entirely from) a resilient material, such as silicone. To inhibit (if not entirely prevent) bacterial (viral) growth, it is envisioned that the drinking hose 106 may include antimicrobial properties. For example, it is envisioned that an antimicrobial agent 136 (FIG. 4) may be incorporated into construction of the drinking hose 106 (e.g., such that the antimicrobial agent 136 is integrated into the drinking hose 106) or that the antimicrobial agent 136 may be applied to the drinking hose 106 as a coating.

The drinking hose 106 defines an (overall) length L (FIG. 1) that allows the user to comfortably draw fluid from the reservoir 102, which may be varied as necessary or desired (e.g., depending upon the particular implementation of the personal hydration system 100). In certain embodiments of the personal hydration system 100, such as that shown throughout the figures, for example, it is envisioned that the drinking hose 106 may be configured to allow a user to draw fluid from the reservoir 102 without having to alter the position of the user's head (e.g., in the context of bedside use in a user's home or in a hospital, hospice, or assisted living environment). For example, it is envisioned that the length L of the drinking hose 106 may lie substantially within the range of approximately 25 cm to approximately 150 cm. Dimensions outside this range, however, would not be beyond the scope of the present disclosure.

In certain embodiments, rather than defining a fixed length L, it is envisioned that the length L of the drinking hose 106 may be variable (e.g., depending upon the particular material(s) of construction utilized). For example, it is envisioned that the drinking hose 106 may include one or more flexible (resilient) materials to permit elongation (e.g., stretching) of the drinking hose 106 during use of the personal hydration system 100.

To further improve the user experience, it is envisioned that the drinking hose 106 may be movably (e.g., rotatably or pivotably) connected to the reservoir 102 such that the drinking hose 106 is movable relative to the reservoir 102 through a range of motion. For example, it is envisioned that the personal hydration system 100 may employ a swivel-style connector 138 (FIG. 1) the provides an interface between the reservoir 102 and the drinking hose 106 and allows for movement of the drinking hose 106 relative to the reservoir 102 through a range of motion that lies substantially within the range of approximately 180° to approximately 540°. Alternatively, it is envisioned that the connector 138 may be configured to allow for continuous, unrestricted movement of the drinking hose 106 relative to the reservoir 102. Stated another way, the range of motion of the drinking hose 106 may be undefined so as to reduce (if not entirely prevent) entanglement of (kinking in) the drinking hose 106.

To inhibit (if not entirely prevent) leakage, in certain embodiments, it is envisioned that the personal hydration system 100 may include one or more sealing members (e.g., gaskets, O-rings, etc.) in any suitable location(s) (e.g., within the connector 138).

The drinking hose 106 includes a longitudinal (axial) fluid channel 140 defining an inner transverse cross-sectional dimension (e.g., a diameter) D (FIG. 5) that extends in generally orthogonal relation to the length L (FIG. 1), through which, fluid is drawn during use of the personal hydration system 100. In the illustrated embodiment, the drinking hose 106 is configured such that the inner transverse cross-sectional dimension D lies substantially within the range of approximately 5 mm to approximately 20 mm. It should be appreciated, however, that values for the dimension D outside of the disclosed range are also contemplated herein and that the drinking hose 106 may be configured to define any dimension D that does not interfere with (frustrate) fluid consumption or cleaning of the drinking hose 106 in the manner described herein.

The drinking hose 106 includes a series of projections 142 (e.g., protrusions, detents, protuberances, or other such surface irregularities) that extend inwardly into the channel 140 from an inner wall 144 thereof, whereby the drinking hose 106 includes a textured (irregular) configuration. As discussed in further detail below, the projections 142 are configured and arranged to facilitate cleaning of the drinking hose 106 (e.g., via abrasion) upon the application of an external force F (FIG. 6) to the drinking hose 106.

Figure 4:
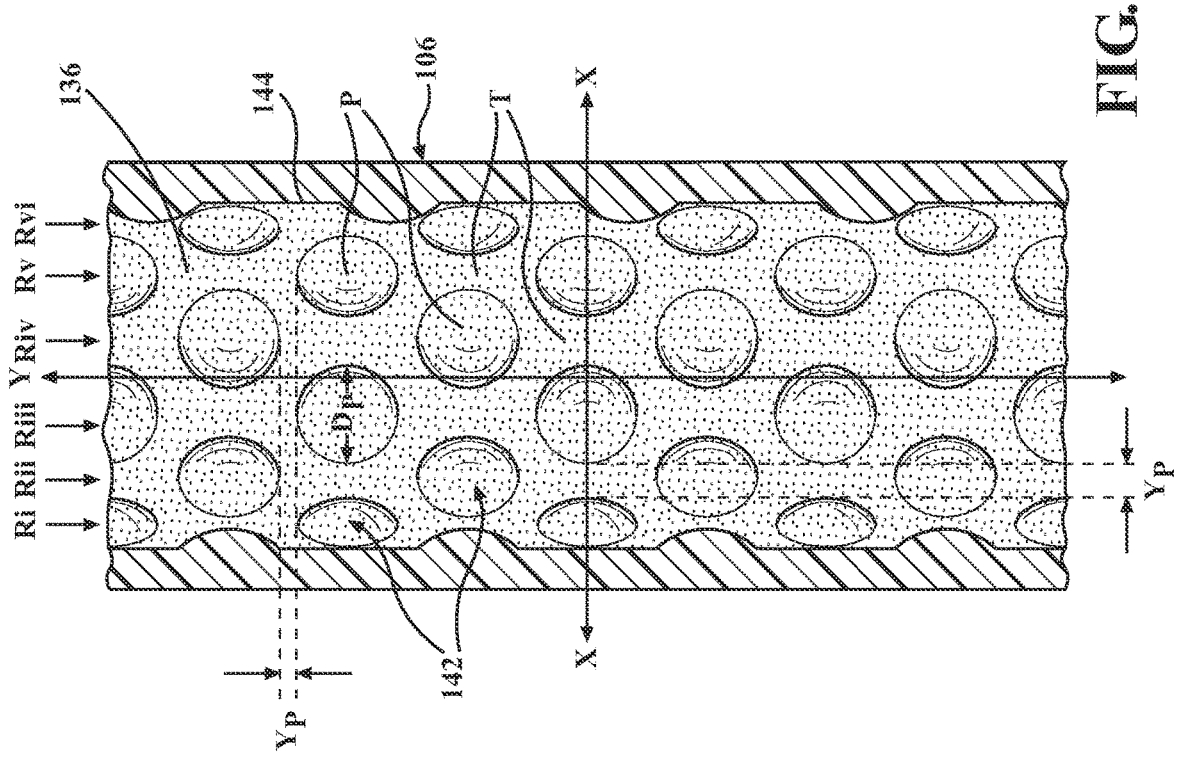
FIG. 4 is a longitudinal (e.g., vertical, axial) cross-sectional view taken through line 4-4 in FIG. 1 illustrating an interior configuration of the drinking hose.

In the illustrated embodiment, each of the projections 142 includes a convex profile (e.g., annular, elliptical, etc.) that defines an arcuate outer surface 146, which imparts a generally dome-shaped configuration to the projections 142. It should be appreciated, however, that the particular configuration of the projections 142 may be varied without departing from the scope of the present disclosure. For example, embodiments in which the projections 142 include a (generally) polygonal (e.g., square, rectangular, hexagonal, etc.) configuration are also contemplated herein, as are embodiments in which the projections 142 are (generally) linear (e.g., rib-like) in configuration. Additionally, while the projections 142 are illustrated as being (generally) identical in configuration throughout the figures, embodiments of the disclosure in which the drinking hose 106 includes projections 142 that vary in configuration are also contemplated herein. For example, it is envisioned that the drinking hose 106 may include one or more projections 142 that are non-linear in configuration (e.g., dome-shaped) (as seen in FIGS. 4-6) and one or more projections 142 that are (generally) linear in configuration (e.g., rib-like).

The projections 142 are arranged on the inner wall 144 in a series of rows R. In the illustrated embodiment, the rows R extend in (generally) parallel relation to a longitudinal axis Y of the drinking hose 106 and in (generally) parallel relation to each other. Embodiments of the disclosure are also envisioned, however, in which the rows R may extend in (generally) non-parallel relation to the longitudinal axis Y of the drinking hose 106 (e.g., the rows R may be arranged in a helical pattern). As seen in FIG. 4, adjacent rows R are offset from each other along the longitudinal axis Y of the drinking hose 106 such that the projections 142 are arranged in a (generally) diamond-shaped (e.g., staggered) pattern, whereby the projections 142 in alternating rows (e.g., rows Ri, Riii) are (generally) aligned along axes X that extend in (generally) transverse (e.g., orthogonal) relation to the longitudinal axis Y. More specifically, in the illustrated embodiment, the projections 142 in alternating rows are (generally) aligned along an inner circumference of the drinking hose 106.

Each projection 142 defines a transverse cross-sectional dimension (e.g., a diameter) Dp (FIG. 5) that lies substantially within the range of approximately 0.5 mm to approximately 12 mm. It should be appreciated, however, that the particular dimensions of the projections 142 may be varied without departing from the scope of the present disclosure. Accordingly, embodiments in which the transverse cross-sectional dimension Dp lies outside of the disclosed range are also contemplated herein.

Figure 5:
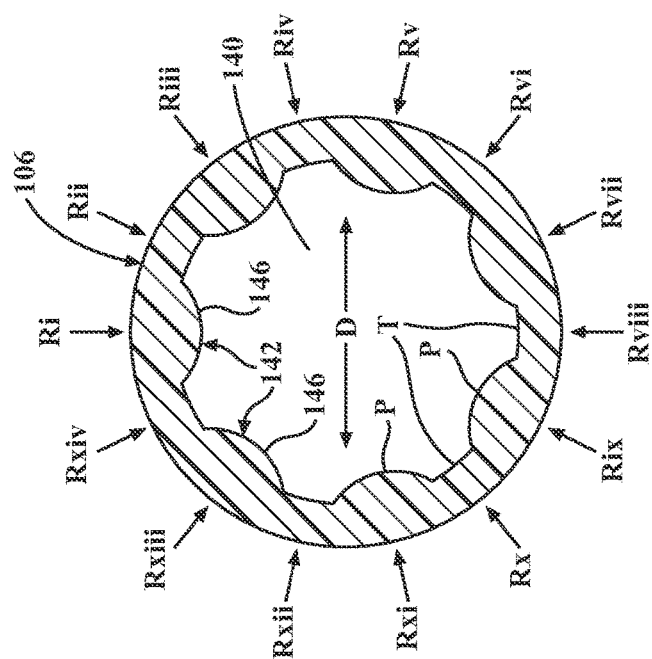
FIG. 5 is a transverse (e.g., horizontal) cross-sectional view taken through line 5-5 in FIG. 1 illustrating the interior configuration of the drinking hose.
Figure 6:
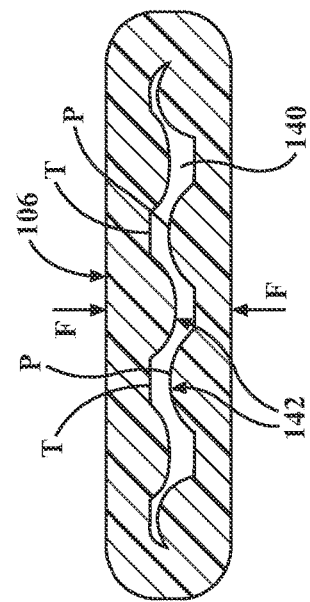
FIG. 6 is a transverse (e.g., horizontal) cross-sectional view taken through line 6-6 in FIG. 1 illustrating the interior configuration of the drinking hose upon the application of an external, compressive force to the drinking hose (e.g., during cleaning).

In the embodiment seen throughout the figures, the projections 142 are spaced axially (e.g., along the longitudinal axis Y of the drinking hose 106) and circumferentially from each other by a distance Yp that is (approximately) equal to one-half of the transverse cross-sectional dimension Dp, which attributes a (generally) sinusoidal profile to the inner wall 144 of the drinking hose 106 that defines peaks P and spaces T (FIGS. 5, 6). Due to the spacing between the projections 142 and the offset between the adjacent rows R, upon the application of an external, compressive force F (FIG. 6) to the drinking hose 106, the spaces T defined between adjacent projections 142 included in one row R (e.g., a first series of projections 142 in row Rii) receive a corresponding (second series) of projections 142 included in another, (generally opposite) row R (e.g., row Rix). By manipulating (e.g., massaging) the drinking hose 106, the projections 142 create an abrading effect (e.g., friction, exfoliation) that loosens and/or removes contaminants (e.g., pet hair, dander, dust, bacteria, etc.) from the drinking hose 106 (e.g., from the projections 142 and the inner wall 144), thereby reducing (if not entirely eliminating) any need to insert a separate tool or apparatus into the drinking hose 106 during cleaning.

As seen in FIG. 1, in certain embodiments, the drinking hose 106 may include a mouthpiece 148 to facilitate the withdrawal of fluid from the reservoir 102 through the drinking hose 106. It is envisioned that the mouthpiece 148 may be either fixedly connected to the drinking hose 106 or, alternatively, that the mouthpiece 148 may be detachable (removable) from the drinking hose 106 to facilitate cleaning, repair, replacement, etc. It is also envisioned that the mouthpiece 148 may be configured to facilitate use of the personal hydration system 100 with a sleep apparatus, such as a CPAP machine (or mask), for example, without requiring removal of the CPAP machine (or mask).

In certain embodiments, it is envisioned that the personal hydration system 100 may further include a holster 150 (or other such mounting member) (FIG. 1) that is configured for connection to (engagement with) the drinking hose 106 (e.g., the mouthpiece 148). For example, in the embodiment seen in FIG. 1, the holster 150 is configured for mounting to the surface S (e.g., via an adhesive, one or more mechanical fasteners, etc.) so as to reduce undesirable contact with the mouthpiece 148 and improve the cleanliness thereof. It is envisioned that the drinking hose 106 (e.g., the mouthpiece 148) and the holster 150 may be configured for connection (engagement) in any suitable manner. For example, in the illustrated embodiment, the mouthpiece 148 and the holster 150 are configured for magnetic engagement (connection). More specifically, the mouthpiece 148 includes a magnetic portion 152 (e.g., a collet 154) that is configured for connection to (engagement with) the holster 150. It should be appreciated, however, that mechanical connections between the mouthpiece 148 and the holster 150 are also contemplated herein. For example, it is envisioned that the mouthpiece 148 and the holster 150 may be configured for engagement (connection) in an interference or snap-fit arrangement.

In certain embodiments, it is envisioned that the mouthpiece 148 may include an internal valve 156 (FIG. 1) to inhibit (if not entirely eliminate) leakage from the drinking hose 106. In such embodiments, it is envisioned that the valve 156 may be manually actuable (e.g., openable and closable) to regulate fluid flow through the drinking hose 106. For example, it is envisioned that the valve 156 may be connected to a lever (not shown) or other such suitable tactile member or that the valve 156 may be configured and positioned for opening upon the application of force by the user's mouth such that the valve 156 functions as a bite-down mechanism.

Figure 7:
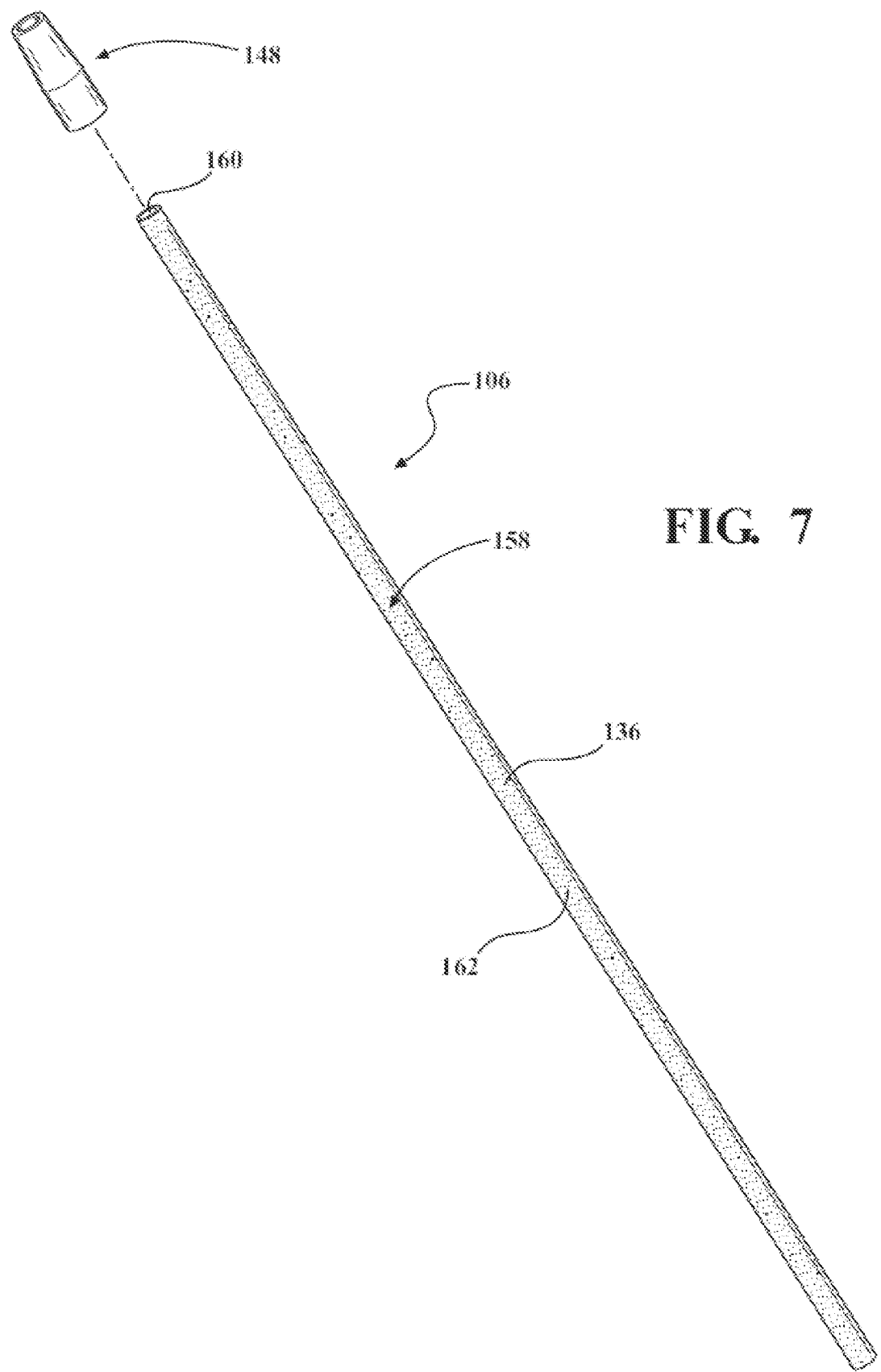
FIG. 7 is a side, perspective view of the drinking hose shown as a standalone component (product).

In certain embodiments of the disclosure, it is envisioned that the drinking hose (drinking straw) 106 may be provided as a standalone component (product) that is separate from the reservoir 102, as seen in FIG. 7. In such embodiments, it is envisioned that the drinking hose 106 may (optionally) include, or may be provided with, the mouthpiece 148 and that the drinking hose 106 may be carried by a user as a personal item for use in any suitable environment or location. For example, it is envisioned that the drinking hose 106 may be used in a restaurant setting, to draw water from a drinking bottle, etc. During non-use, it is envisioned that the drinking hose 106 may be collapsed (e.g., folded, rolled, etc.) and stored by the user in any suitable manner (e.g., in the user's pocket, handbag, a storage container, etc.).

To inhibit (if not entirely prevent) bacterial and/or viral growth, in certain embodiments, the drinking hose 106 may include the aforementioned antimicrobial agent 136. For example, as illustrated in FIG. 7, it is envisioned that the antimicrobial agent 136 may be configured as a coating 158 that can be applied to an inner surface 160 of the drinking hose 106 (e.g., within the (fluid) channel 140 (FIG. 5)), an outer surface 162 of the drinking hose 106, and/or the mouthpiece 148 (when included). As discussed above, it is also envisioned that the antimicrobial agent 136 may be incorporated into construction of the drinking hose 106 (e.g., such that the material comprising the drinking hose 106 is impregnated with the antimicrobial agent 136).

Persons skilled in the art will understand that the various embodiments of the disclosure described herein and shown in the accompanying figures constitute non-limiting examples, and that additional components and features may be added to any of the embodiments discussed herein without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms, such as "comprises," "includes," and "having," should be understood to provide support for narrower terms, such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately," "generally," and "substantially" should be understood to encompass variations on the order of 25% (or less), or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A method of cleaning a drinking straw, the method comprising:
applying an external force to the drinking straw such that internal projections arranged along an inner surface of the drinking straw are brought into engagement with each other and spaces therebetween to thereby loosen and/or remove contaminants from the drinking straw.

2. The method of claim 1, wherein applying the external force to the drinking straw includes positioning a first series of projections between a second series of projections, wherein each projection includes a dome-shaped configuration defining a diameter within a range of approximately 0.5 mm to approximately 12 mm.

3. The method of claim 2, wherein positioning the first series of projections between the second series of projections includes positioning projections arranged in a first row between adjacent projections arranged in a second row.

4. The method of claim 1, wherein applying the external force to the drinking straw includes compressing the drinking straw.

5. The method of claim 4, wherein compressing the drinking straw includes reducing an inner diameter thereof from an initial dimension that lies within a range of approximately 5 mm to approximately 20 mm.

6. The method of claim 4, further comprising manipulating the drinking straw such that the projections create an abrading effect.

7. A method of cleaning a drinking straw, the method comprising:
compressing the drinking straw so as to bring internal projections arranged along an inner surface of the drinking straw into contact with each other and thereby create an abrading effect that loosens and/or removes contamin ants from the drinking straw, wherein the drinking straw defines an inner diameter within a range of approximately 5 mm to approximately 20 mm to allow for fluid to be drawn through the drinking straw during fluid consumption.

8. The method of claim 7, wherein compressing the drinking straw includes positioning a first series of projections between a second series of projections.

9. The method of claim 8, wherein positioning the first series of projections between the second series of projections includes positioning the first series of projections within spaces among the second series of projections, wherein each space is equal to approximately one-half of a diameter of each projection.

10. The method of claim 7, wherein compressing the drinking straw includes positioning a first series of projections between a second series of projections, wherein each projection includes a dome-shaped configuration defining a diameter within a range of approximately 0.5 mm to approximately 12 mm.

* * * * *